United States Patent Office 3,036,981
Patented May 29, 1962

3,036,981
PROCESS FOR RENDERING A CROSS-LINKED CARBON BLACK - CONTAINING POLYETHYLENE EXTRUDABLE AND RESULTING PRODUCT
Walter S. Ropp, Wilmington, Del., assignor to Hercules Powder Company, Wilmington, Del., a corporation of Delaware
No Drawing. Filed Dec. 31, 1957, Ser. No. 706,244
9 Claims. (Cl. 260—41)

The present invention relates to a process for preparing thermoplastic polymer compositions comprising polyethylene and carbon black and to the product thereof.

It is known that polyethylene can be reinforced and simultaneously cross-linked by heating in the presence of both carbon black and certain organic peroxides. For instance, in copending application, Serial No. 660,061, filed May 20, 1957, now abandoned, there is disclosed a process which comprises heating polyethylene in the presence of carbon black and a peroxide of the formula:

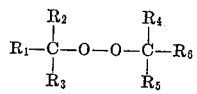

Formula I wherein $R_1$ is an aryl radical, $R_2$, $R_3$, $R_4$ and $R_5$ are hydrogen or alkyl radicals of less than four carbon atoms and $R_6$ is hydrogen, an aryl radical or an alkyl radical of less than four carbon atoms, whereby the polyethylene is simultaneously cross-linked and reinforced.

The products of this process may have many desirable properties and a wide range of utility. It has previously been presumed, however, that once cross-linking has been effected, further processing of the polymer is not possible because it has lost its thermoplasticity and, therefore, can no longer be molded or extruded.

In accordance with the present invention, it has been found that compositions comprising polyethylene and carbon black in which the polyethylene has been cross-linked by the above process can be made thermoplastic by mechanical working at an elevated temperature without loss of strength. It is, of course, not surprising that mechanical working results in thermoplasticity because working is known to degrade polymers, but it is surprising that in the present invention the transformation to thermoplasticity is not accompanied by a decrease in strength.

The invention can be put to many practical applications; for example, cross-linked polyethylene-carbon black compositions can be reclaimed and rendered reprocessable in conventional molding or extruding apparatus. Alternatively, a thermoplastic product can be made directly by the prolonged working of a polyethylene-carbon black-peroxide mixture whereby cross-linking and polymer degradation progress more or less simultaneously.

More specifically, the process of the invention comprises subjecting polyethylene which has been cross-linked by heating in the presence of carbon black and a peroxide of Formula I to mechanical working at an elevated temperature, preferably above about 250° F., until a thermoplastic, extrudable composition is obtained.

The following examples are presented to illustrate the invention. Parts and percentages are by weight unless otherwise specified. The molecular weight of the polymers employed in the examples is shown by the reduced specific viscosity (RSV) given for each. By the term "reduced specific viscosity" is meant the specific viscosity, corrected to zero shear gradient, divided by the concentration of the solution in grams per 100 milliliters, measured at 135° C., on a solution in decalin containing 0.1 gram of the polymer in 100 milliliters of the solution.

EXAMPLE 1

A blend of 100 parts linear, high density polyethylene having an RSV of 2.2, 50 parts of medium thermal carbon black and 1 part of bis(α,α-dimethylbenzyl) peroxide was prepared by milling on a two-roll mill at 280° F. Milling was continued just long enough to produce a homogeneous mixture; this required about 15 minutes.

This blend of polyethylene, carbon black and peroxide had obviously undergone cross-linking on the mill because it had a Tinius-Olsen flow value of 0.15 inch/2 minutes measured at 150° C. and 100 p.s.i. A portion of the blend was compression molded for 45 minutes at 350° F. and had a tensile strength of 2690 p.s.i. The remainder of the blend was placed in a Banbury mixer and periodically samples were withdrawn from the mixer for determination of flow and tensile strength. The following table shows the mixing conditions and the tests results.

Table I

| Sample No. | Banbury Mixing Cond. | | | T.O. Flow, in./2 Min., 150° C./p.s.i. 100 | Tensile Strength (p.s.i.) |
|---|---|---|---|---|---|
| | Temp. (° F.) | Time | Speed | | |
| 1 | 290 | 7 | Slow | .15 | not obtained |
| 2 | 320 | 13 | Slow | .16 | 3,250 |
| 3 | 300–310 | 36 | Med | .43 | 3,150 |
| 4 | 255 | 50 | Med | .47 | 3,030 |
| 5 | 245–250 | 63 | High | .55 | 3,000 |
| 6 | 245–250 | 85 | High | .80 | 3,000 |

From the data in the table it is obvious that as the amount of mechanical working increased, the flow or thermoplasticity of the polymer blend also increased. Samples 3–6 were all moldable into objects with smooth surfaces and Samples 5 and 6 had such thermoplasticity that they could be extruded smoothly in conventional manner. It is most notable that this increase in thermoplasticity was not accompanied by any significant loss of tensile strength.

EXAMPLE 2

A blend of the same polyethylene, carbon black and peroxide was prepared as in Example 1, with the exception that the amount of peroxide was reduced to 0.5 parts. The Tinius-Olsen flow value of the mill blend was 0.32 inch/2 minutes measured at 150° C. and 100 p.s.i. A compression molded specimen of the blend had a tensile strength of 3220 p.s.i. The blend was next extruded three times in a National Rubber Machinery Company (NRM) one inch extruder at a temperature of 525° F. The Tinius-Olsen flow value was thereby increased to 0.5 inch/2 minutes and a compression molded specimen from this thrice extruded blend had a tensile strength of 3600 p.s.i. Again, it is observed that there is a significant increase in thermoplasticity without loss of strength.

EXAMPLE 3

A blend of 100 parts polyethylene as described in Example 1, 50 parts of medium thermal carbon black and 1 part of bis(α,α-dimethylbenzyl) peroxide was prepared by dry blending for 15 minutes. This dry blended mixture was next extruded in a 1.25 inch Hartig extruder at 525° F. After one extrusion, the tensile strength was 3200 and the Tinius-Olsen flow value (as measured in Example 1) was 0.13 inch/2 minutes. After four additional passes through the extruder, the blend had a tensile strength of 3170 p.s.i. and a Tinius-Olsen flow value of 0.28 inch.

EXAMPLE 4

A blend of 100 parts polyethylene as identified in Example 1, 50 parts of high-abrasion furnace black and 0.1 part of bis(α,α-dimethylbenzyl) peroxide was prepared by dry blending for 15 minutes. (Preliminary to blending, the peroxide was dissolved in a substantial quantity of acetone, the polyethylene particles mixed with the acetone, and the acetone thereafter evaporated.)

The blend of polymer and other ingredients was extruded in an NRM one inch extruder at 375° F. but the extruded rod had very rough surfaces showing that cross-linking had taken place during extrusion. The tensile strength of a compression molded sample of the extrudate was 2100 p.s.i.

The 375° F. extrudate was again reextruded at 425° F. and again the extrudate was rough. This was followed by reextrusion at 475° F. but the extrudate was still rough. Finally, after reextrusion at 525° F., a smooth extrudate was obtained and a compression molded specimen of the extrudate had a tensile strength of 3900 p.s.i.

EXAMPLE 5

A dry blend similar to that prepared in Example 4 was made with an increase in the amount of peroxide to 0.5 part. The blend was extruded in the manner of Example 4 at 375° F. and reextruded at 425° F. Both extrudates were rough and the tensile strength of a compression molded specimen of the second extrudate was 3825 p.s.i.

The 425° F. extrudate was reextruded at 475° F., again at 525° F., again at 425° F.; and still the quality of the extrudate was poor. Finally, the last extrudate was milled on a two-roll mill at 345° F. for 30 minutes. The milled composition was easily extruded at 425° F. in the form of smooth, continuous rods. A compression molded specimen from the milled composition had a tensile strength of 4490 p.s.i.

In Examples 4 and 5 it is shown that the working at elevated temperature of the polyethylene-carbon black-peroxide blend resulted first in cross-linking and finally in sufficient degradation to produce an extrudable, thermoplastic material of high tensile strength.

In the peroxides of Formula I, $R_2$, $R_3$, $R_4$, $R_5$ and $R_6$ may all be the same or each may be a different group or any two or more may be the same or different. Similarly, $R_1$ and $R_6$ may be the same or different when the latter is an aryl group.

The aryl groups referred to in Formula I may, for example, be phenyl, naphthyl, anthryl, phenanthryl, and the like. The aryl groups may contain alkyl substituents as in the case of methylphenyl, ethylphenyl, propylphenyl, isopropylphenyl, butylphenyl, isobutylphenyl, t-butylphenyl, pentamethylethylphenyl, dimethylphenyl, methylethylphenyl, etc., and corresponding alkyl derivatives of the other aryl groups mentioned. The term "aryl" as used herein includes alkaryl groups. When an alkyl substituent in an aryl group contains less than 4 carbon atoms, it may be the same as or different from any of $R_2$, $R_3$, $R_4$ or $R_5$. Aryl groups in which the alkyl substituents, if any, contain less than 8 carbon atoms are preferred.

The peroxides of Formula I include the following symmetrical or bis(aralkyl) peroxides:

dibenzyl peroxide,
bis($\alpha$-methylbenzyl) peroxide,
bis($\alpha$-ethylbenzyl) peroxide,
bis($\alpha$-propylbenzyl) peroxide,
bis($\alpha$-isopropylbenzyl) peroxide,
bis($\alpha,\alpha$-dimethylbenzyl) peroxide,
bis($\alpha$-methyl-$\alpha$-ethylbenzyl) peroxide,
bis($\alpha,\alpha$-diethylbenzyl) peroxide,
bis($\alpha,\alpha$-dipropylbenzyl) peroxide,
bis($\alpha,\alpha$-disopropylbenzyl) peroxide,
bis($\alpha,\alpha$-diisopropylnaphthylmethyl) peroxide,
bis($\alpha,\alpha$-dimethylnaphthylmethyl) peroxide,
bis($\alpha,\alpha$-dimethyl-p-methylbenzyl) peroxide,
bis($\alpha$-methyl-$\alpha$-ethyl-p-methylbenzyl) peroxide,
bis($\alpha,\alpha$-diethyl-p-methylbenzyl) peroxide,
bis($\alpha,\alpha$-diisopropyl-p-methylbenzyl) peroxide,
bis($\alpha,\alpha$-dimethyl-p-ethylbenzyl) peroxide,
bis($\alpha$-methyl-$\alpha$-ethyl-p-ethylbenzyl) peroxide,
bis($\alpha,\alpha$-diethyl-p-ethylbenzyl) peroxide,
bis($\alpha,\alpha$-diisopropyl-p-ethylbenzyl) peroxide,
bis($\alpha,\alpha$-dimethyl-p-isopropylbenzyl) peroxide,
bis($\alpha$-methyl-$\alpha$-ethyl-p-isopropylbenzyl) peroxide,
bis($\alpha,\alpha$-diethyl-p-isopropylbenzyl) peroxide,
bis($\alpha,\alpha$-diisopropyl-p-isopropylbenzyl) peroxide,
bis($\alpha,\alpha$-dimethyl-p-t-butylbenzyl) peroxide,
bis($\alpha$-methyl-$\alpha$-ethyl-p-t-butylbenzyl) peroxide,
bis($\alpha,\alpha$-diethyl-p-t-butylbenzyl) peroxide,
bis($\alpha,\alpha$-diisopropyl-p-t-butylbenzyl) peroxide,
bis($\alpha,\alpha$-dimethyl-p-pentamethylethylbenzyl) peroxide,
bis($\alpha$-methyl-$\alpha$-ethyl-p-pentamethylethylbenzyl) peroxide,
bis($\alpha,\alpha$-diethyl-p-pentamethylethylbenzyl) peroxide, and
bis($\alpha,\alpha$-diisopropyl-p-pentamethylethylbenzyl) peroxide.

Unsymmetrical peroxides containing two aryl groups include the following compounds:

benzyl($\alpha$-methylbenzyl) peroxide,
benzyl($\alpha$-methyl-p-methylbenzyl) peroxide,
benzyl($\alpha$-methyl-p-isopropylbenzyl) peroxide,
benzyl($\alpha,\alpha$-dimethylbenzyl) peroxide,
benzyl($\alpha,\alpha$-dimethyl-p-methylbenzyl) peroxide,
benzyl($\alpha,\alpha$-dimethyl-p-isopropylbenzyl) peroxide,
$\alpha$-methylbenzyl($\alpha,\alpha$-dimethylbenzyl) peroxide,
$\alpha$-methylbenzyl($\alpha,\alpha$-dimethyl-p-methylbenzyl) peroxide,
$\alpha$-methylbenzyl($\alpha,\alpha$-dimethyl-p-isopropylbenzyl) peroxide,
$\alpha$-isopropylbenzyl($\alpha,\alpha$-diisopropylbenzyl) peroxide,
$\alpha,\alpha$-dimethylbenzyl($\alpha,\alpha$-dimethyl-p-methylbenzyl) peroxide,
$\alpha,\alpha$-diisopropylbenzyl($\alpha,\alpha$-diisopropyl-p-methylbenzyl) peroxide, and
$\alpha,\alpha$-diisopropylbenzyl($\alpha,\alpha$-diisopropyl-p-isopropylbenzyl) peroxide.

Alkyl-aralkyl peroxides of Formula I are exemplified by methyl($\alpha,\alpha$-dimethylbenzyl) peroxide,
t-butyl,$\alpha,\alpha$-dimethylbenzyl) peroxide,
methyl($\alpha,\alpha$-dimethyl-p-isopropylbenzyl) peroxide, and
methyl($\alpha,\alpha$-dimethyl-p-methylbenzyl) peroxide.

In general, the peroxides of Formula I are characterized by containing at least about 10 carbon atoms and usually not more than about 40 carbon atoms. Di(aralkyl) peroxides containing 14 to about 25 carbon atoms are preferred because they may be prepared from readily available materials and some are commercially available. The peroxides, both the symmetrical and unsymmetrical, alkyl-aralkyl and di(aralkyl), peroxides, can be prepared by methods known to the art.

The polyethylene which is treated in accordance with the invention can be any of the various types of polyethylene known to the art. High-pressure or low-density polyethylene, for example, can be prepared by the typical method described in U.S. 2,153,553. Low-pressure polyethylene can be prepared as described in Belgian Patents 530,617, 533,362, 534,792, 534,888, 538,082 and U.S. Patents 2,658,059, 2,710,854, 2,728,755 and 2,731,452.

The carbon black employed in the practice of the invention can be any of the known varieties of carbon black which are useful in reinforcing rubber including, for instance, furnace black, channel black, thermal black and the like.

The process of the invention as previously described is characterized by the mechanical working at an elevated temperature of polyethylene which has been cross-linked by heating in the presence of carbon black and a peroxide of Formula I. There are, as the examples show, several variations to the process. For example, polyethylene can be cross-linked in the presence of carbon black and a peroxide under essentially static conditions as disclosed in copending application Serial No. 660,061 and then the cross-linked polyethylene can be subjected to mechanical working in accordance with this invention. Alternatively, the polyethylene can be mechanically worked in the presence of carbon black and the peroxide so that cross-linking is brought about during the working and the working is then continued until degradation is obtained sufficient to result in a final thermoplastic polymer that is reinforced with carbon.

The relative quantities of polyethylene, carbon black and peroxide which can be used to cross-link and reinforce the polyethylene are described in the aforesaid copending application. Repeating for the sake of completion, the amount of peroxide can vary from about 0.1% to 20% based on the weight of polyethylene with the optimum amount generally lying between about .1% and 10%. The amount of carbon black preferably ranges from about 10% by weight of the polyethylene up to the maximum amount that can be blended therewith, a practical maximum being about three times the weight of the polymer depending on the type of polymer and the characteristics of the polyethylene.

In one of the modifications of the invention a blend of the polyethylene, carbon black and peroxide is first prepared by any of several conventional methods and then cross-linking is effected by heating as, for example, during compression molding or extrusion. The cross-linked polymer which is substantially reinforced by the carbon black and which has a low degree of thermoplasticity is then mechanically worked according to the invention. An elevated temperature is required for the working and a temperature of at least 250° F. is preferred. The working can be accomplished in any type of apparatus that is capable of kneading, milling, extruding or otherwise working the polymer. As the mechanical working progresses, it has been shown in this invention that the thermoplasticity of the cross-linked polyethylene increases without any significant loss in strength. The time required to accomplish this objective is quite variable and the optimum time depends on many factors, such as the amount of peroxide employed, the initial molecular weight of the polymer, the type of carbon black, etc. A simple test to determine whether or not the polymer has been made sufficiently thermoplastic is to extrude it in the form of a rod at temperature of about 50° F. above the minimum temperature required for the smooth extrusion of a similar composition containing no peroxide and observe whether or not the surfaces of the extruded rod are smooth; if so, the amount of working is sufficient.

In another modification of the invention, a blend of the polyethylene, peroxide and carbon black in which no cross-linking has yet taken place is directly subjected to mechanical working whereby cross-linking takes place and partly simultaneously and partly thereafter degradation of the polymer is brought about. As in the modification previously described, the working, of course, is continued until an extrudable thermoplastic polymer is obtained. The maximum temperature during mechanical working is not a critical factor in the invention, but for practical purposes the maximum temperature can be given as about 600° F.

In addition to the polyethylene, peroxide and carbon black, other ingredients can be employed in practicing the invention, for instance, extenders, pigments, plasticizers, antioxidants, lubricants, and the like.

The products produced according to the invention are not only thermoplastic and extrudable but there has been shown to be chemical bonding of the polyethylene to the carbon black. This property has been demonstrated by the fact that the products of the invention, when subjected to prolonged contact with hot xylene, swell to a loose gel from which carbon black cannot be separated physically as, for example, by centrifugation. By contrast, when a simple physical mixture of polyethylene and carbon black is subjected to hot xylene or other aromatic solvent, polyethylene dissolves and carbon black separates and may be obtained in substantially pure form by centrifugation.

What I claim and desire to protect by Letters Patent is:

1. The process which comprises mechanically working a cross-linked polyethylene composition comprising polyethylene, carbon black in an amount in the range of 10–30% of the weight of the polyethylene, and a peroxide in an amount in the range of 0.1–20% of the weight of the polyethylene, said peroxide having the formula

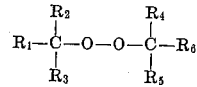

where $R_1$ is an aryl radical, $R_2$, $R_3$, $R_4$ and $R_5$ are selected from the group consisting of hydrogen and alkyl radicals of less than 4 carbon atoms, and $R_6$ is selected from the group consisting of hydrogen, aryl radicals, and alkyl radicals of less than 4 carbon atoms, said polyethylene composition having been cross-linked by heating at a cross-linking temperature until the composition is no longer extrudable as a smooth rod at a temperature lower than 50° F. above the minimum temperature at which the uncured composition is extrudable as a smooth rod, said mechanical working being carried out at a temperature in the range of about 250° F.–600° F. until the cross-linked composition is again extrudable as a smooth rod at a temperature lower than 50° F. above the minimum temperature at which the uncured composition is extrudable as a smooth rod.

2. The process of claim 1 in which the peroxide is bis($\alpha,\alpha$-dimethylbenzyl) peroxide.

3. The process of claim 1 in which the carbon black is furnace black.

4. The process of claim 1 in which the carbon black is thermal black.

5. A thermoplastic, extrudable, polyethylene composition containing chemically combined carbon black prepared by the process of claim 1.

6. The process for making thermoplastic, extrudable polyethylene reinforced with chemically bound carbon black which comprises mechanically working a mixture of polyethylene, carbon black, and a peroxide cross-linking catalyst of the formula

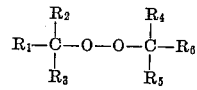

where $R_1$ is an aryl radical, $R_2$, $R_3$, $R_4$ and $R_5$ are selected from the group consisting of hydrogen and alkyl radicals of less than 4 carbon atoms, and $R_6$ is selected from the group consisting of hydrogen, aryl radicals, and alkyl radicals of less than 4 carbon atoms at a cross-linking temperature in the range of about 250° F. to about 600° F. until maximum cross-linking has taken place and the catalytic action of the peroxide catalyst has ceased, and the cross-linked composition is no longer extrudable as a smooth rod at a temperature lower than 50° F. above the minimum temperature at which said mixture was extrudable as a smooth rod prior to cross-linking, continuing said mechanical working at a temperature in the same range until the cross-linked composition is again extrudable as a smooth rod at a temperature lower than 50° F. above the minimum temperature at which the uncured composition is extrudable as a smooth rod.

7. The process of claim 6 in which the peroxide is bis($\alpha,\alpha$-dimethylbenzyl) peroxide.

8. The process of claim 6 in which the carbon black is furnace black.

9. The process of claim 6 in which the carbon black is thermal black.

(References on following page)

References Cited in the file of this patent

UNITED STATES PATENTS

| | | |
|---|---|---|
| 2,461,193 | Banbury et al. | Feb. 8, 1949 |
| 2,826,570 | Ivett | Mar. 11, 1958 |
| 2,832,748 | Safford et al. | Apr. 29, 1958 |
| 2,876,133 | Iler et al. | Mar. 3, 1959 |
| 2,888,424 | Precopio et al. | May 26, 1959 |

FOREIGN PATENTS

| | | |
|---|---|---|
| 564,514 | Great Britain | Feb. 1, 1944 |
| 635,912 | Great Britain | Apr. 19, 1950 |

OTHER REFERENCES

Raff et al.: "Polyethylene," pages 401–402, 1956, Interscience Publishers Inc.